United States Patent [19]

Vanderkooi, Jr. et al.

[11] Patent Number: 4,508,769

[45] Date of Patent: Apr. 2, 1985

[54] PROCESS TO FORM AMORPHOUS, CRYSTALLIZABLE THERMOPLASTIC POLYMERS

[75] Inventors: Nicholas Vanderkooi, Jr., Pompton Plains; Philip E. Stevenson, South Orange; Robert J. Welgos, Wharton, all of N.J.

[73] Assignee: Allied Corporation, Morris Township, Morris County, N.J.

[21] Appl. No.: 580,396

[22] Filed: Feb. 15, 1984

Related U.S. Application Data

[62] Division of Ser. No. 395,432, Jul. 6, 1982, Pat. No. 4,455,417.

[51] Int. Cl.$^3$ ............................................. F16L 11/00
[52] U.S. Cl. ..................................... 428/36; 428/220; 528/323; 528/324
[58] Field of Search ................... 428/36, 220; 528/323, 528/324

[56] References Cited

U.S. PATENT DOCUMENTS

| | | | |
|---|---|---|---|
| 3,861,973 | 1/1975 | Koch | 428/36 X |
| 4,028,476 | 6/1977 | Kleinschmidt et al. | 428/220 |
| 4,243,074 | 1/1981 | Strutzel et al. | 428/36 X |
| 4,444,829 | 4/1984 | Bollen et al. | 428/220 |
| 4,455,417 | 6/1984 | Vanderkooi et al. | 528/324 X |

FOREIGN PATENT DOCUMENTS 0038582  3/1981  European Pat. Off. .

*Primary Examiner*—Lucille M. Phynes
*Attorney, Agent, or Firm*—Richard A. Negin; Jay P. Friedenson; Richard A. Anderson

[57] ABSTRACT

A method of forming an amorphous crystallizable thermoplastic polymer composition. The polymer composition has a modulus of rigidity which decreases to a minimum value with increasing temperature and then begins to increase. The process includes heating polymer to below a temperature at which crystal formation occurs and form the polymer. The polymer composition is then heated to a temperature at which crystal formation can occur and be annealed. This process is useful to make articles having a thickness of from 0.127 cm (0.050 inches) to 1.27 cm (0.50 inches) such as sheets and tubes of the amorphous polymer and then reforming and annealing them.

9 Claims, 3 Drawing Figures

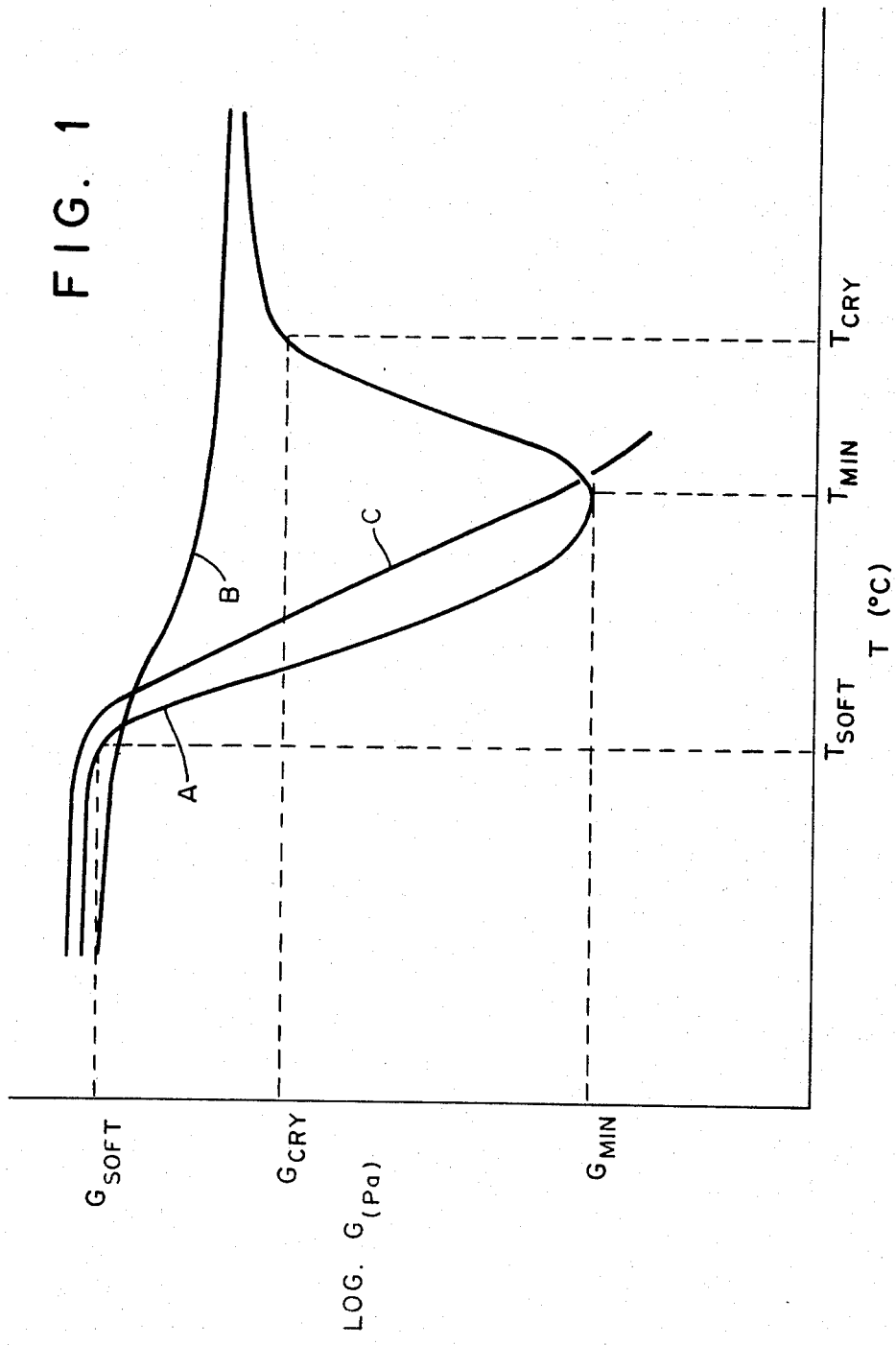

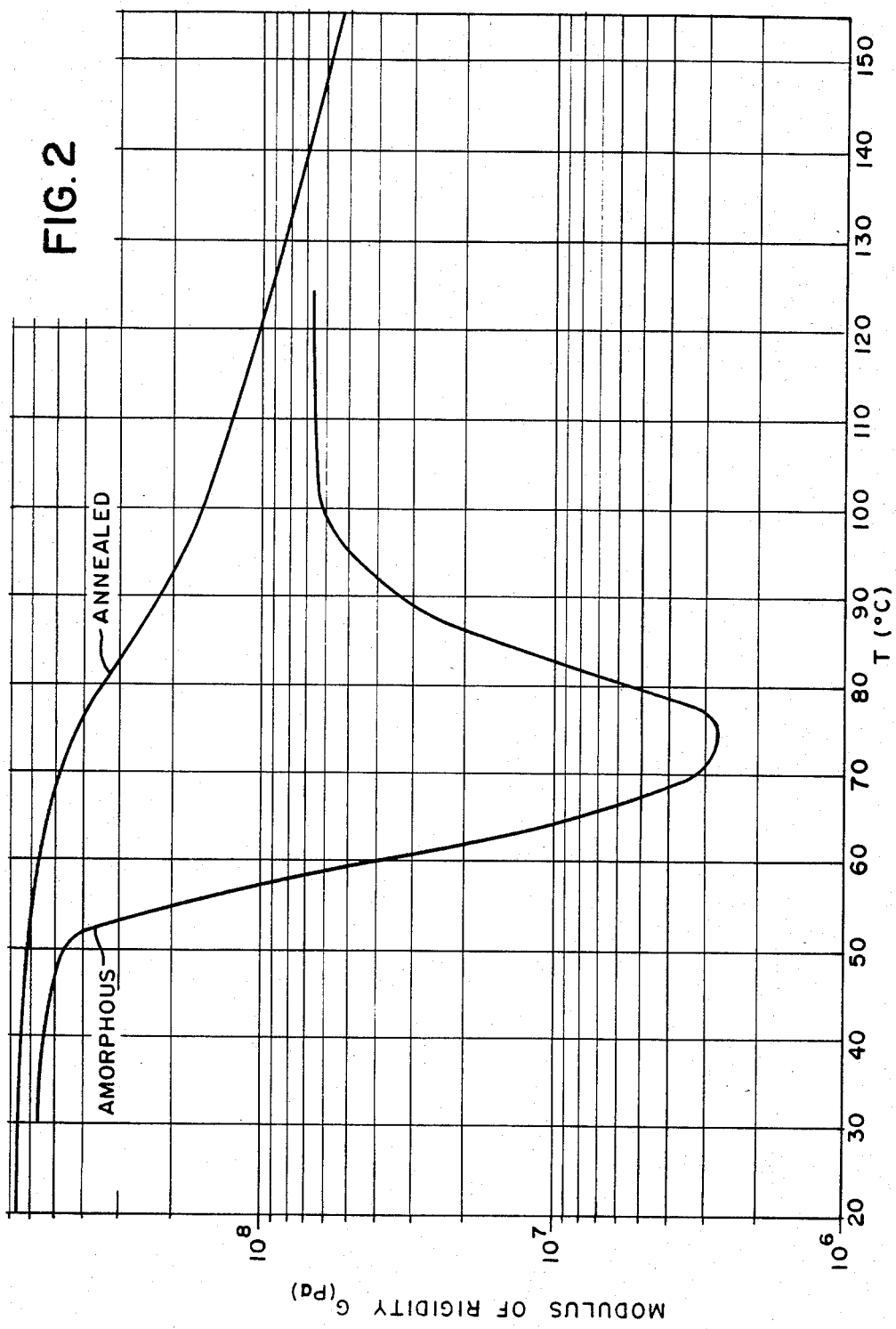

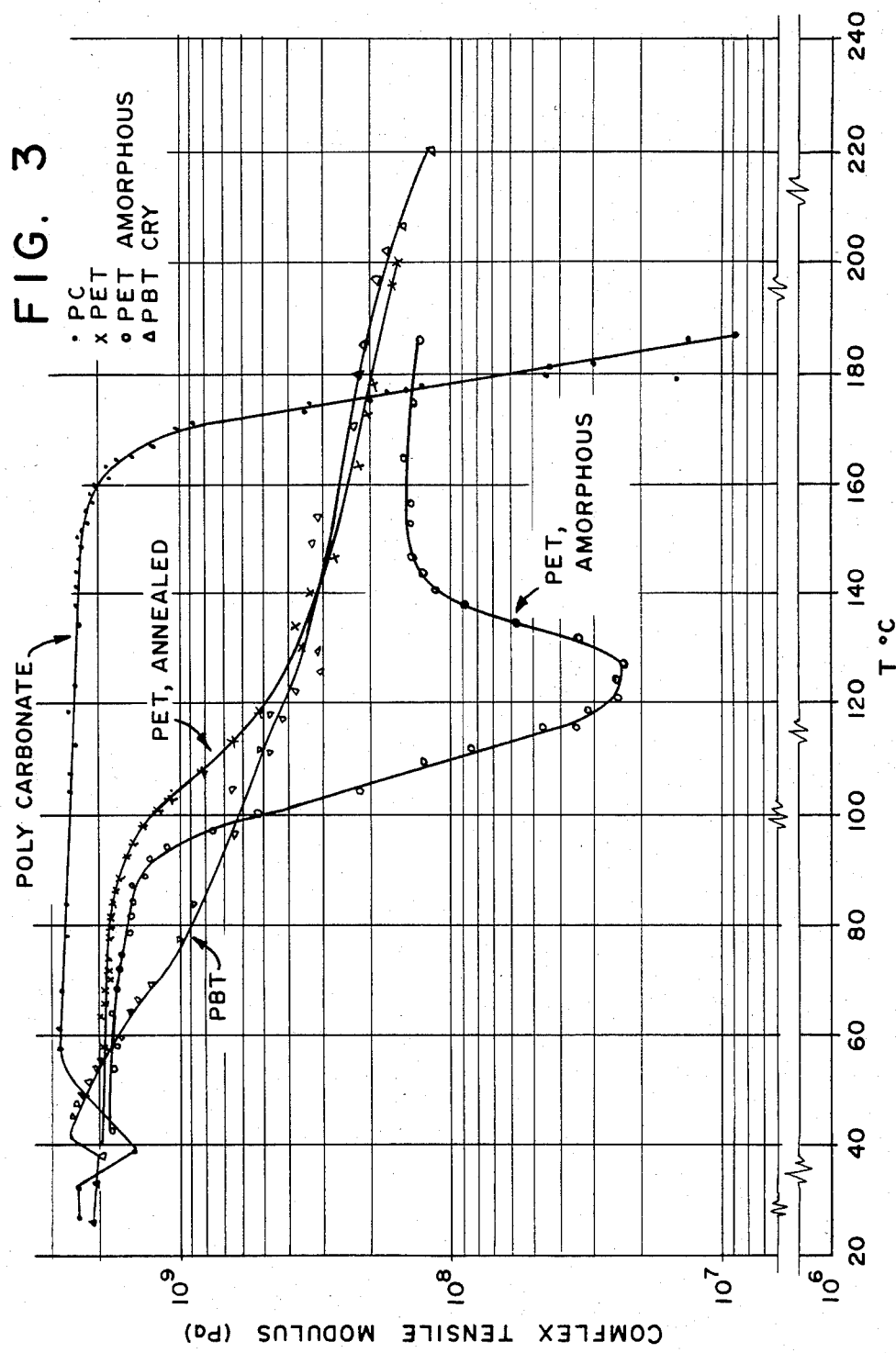

PROCESS TO FORM AMORPHOUS, CRYSTALLIZABLE THERMOPLASTIC POLYMERS

This application is a division, of application Ser. No. 395,432, filed July 6, 1982, now U.S. Pat. No. 4,455,417.

DESCRIPTION

BACKGROUND OF THE INVENTION

This invention is in the field of forming thermoplastic polymers, more particularly this invention relates to a process to form amorphous, crystallizable thermoplastic polymers.

Presently, crystallizable thermoplastic polymers are formed or shaped by heating them to their softening or melting temperature and exerting force to shape the polymeric material. The formed polymeric material crystallizes to some degree upon cooling from the temperature at which it was formed. The formed article is a crystallized thermoplastic article. Reshaping of the formed thermoplastic articles involves heating the polymer until it is sufficiently soft to be reshaped. This involves heating the polymer to a softening temperature close to or above the melt temperature of the polymer. During the heating of the polymer to the melting temperature, more crystals form making it necessary to continue to heat the polymer to the softening point before shaping can occur.

U.S. Pat. No. 4,123,473 discloses a process to form a thin sheet of an amorphous blend of polycarbonate and polyester, at temperatures from 99° C. (210° F.) to 138° C. (280° F.). It does not disclose forming the polycarbonate and polyester blend and then annealing it. Rather, the goal of this patent is to maintain the formed article amorphous so that it retains its dimensions and clarity.

For the purposes of the present invention, thermoplastic polymers can be characterized by a $T_{ch}$ and a $T_{cc}$. The $T_{ch}$ is the temperature upon heating the polymer at which crystal formation is first measurable. It is an indication of the lowest temperature at which crystals form upon cooling the polymer. The $T_{cc}$ is the temperature upon cooling the polymer from the melt at which crystal formation is first measurable. To form such a crystallizable thermoplastic polymer, the polymer has to be heated until it is soft enough to be shaped by suitable equipment. This involves heating the polymer to above the $T_{ch}$ during which crystals continue to form. The formation of crystals makes the polymer stiffer and more difficult to form requiring that the polymer be heated to a high enough temperature at which the stiffening effect of the crystals is destroyed. Upon heating it to such a formable temperature, the polymer can be formed. The polymer is then cooled and upon cooling below $T_{cc}$ crystals once again begin to form resulting in a crystallized formed polymer article. To reform the article once again requires heating to a temperature at which the crystals again disappear.

In characterizing thermoplastic polymers there are polymers that have a very low $T_{ch}$. These polymers crystallize at a very low temperature. There are polymers that have very high $T_{cc}$. Once these polymers are cooled from the melt, they begin to crystallize immediately and rapidly. Further, with a minimal of heating the extent of crystallinity increases. Typical crystalline polymers include polycaprolactam, polyhexamethylene adipamide, and polybutylene terephthalate. There are thermoplastic polymers which remain amorphous or noncrystalline up to their melt temperatures. In a sense these polymers have a very low $T_{cc}$ or a very high $T_{ch}$ and slow crystallization rates. Upon cooling from the melt, crystals will not form even when cooling them to very low temperatures. Upon heating them, crystals will not form before the melt temperature is reached. One such amorphous polymer is polycarbonate.

SUMMARY OF THE INVENTION

The present invention is a method of forming an amorphous crystallizable thermoplastic polymer of the type having a $T_{ch}$ which is higher than the glass transition temperature, $T_g$. The process comprises the steps of heating the polymer in its amorphous state to between the $T_g$ and the $T_{ch}$. The polymer is amorphous during this heating and is formable. The next step is to form the polymer to the desired shape. Once the polymer is formed the polymer is heated to between the $T_{ch}$ and $T_{cc}$ for a sufficient time to form crystals. The polymer is then cooled.

This method has the advantage of being able to form and reform the amorphous polymer at a low temperature between $T_g$ and $T_{ch}$ and then heat the polymer to above the $T_{ch}$, but below the $T_{cc}$, for sufficient time to form crystals. The crystallized polymer is stiff and retains its stiffness upon reheating. The polymer cannot be reformed until it is heated and the stiffening effect of the crystals is destroyed. It is required to heat the polymer close to or above the melting temperature to reform the polymer.

The method of the present invention is particularly useful for the polymer class which can be characterized by how its stiffness changes with changes in temperature (T). Preferably, stiffness is measured by modulus of rigidity (G). The preferred class of polymers of the present invention has a modulus of rigidity which decreases to a $G_{min}$ at a $T_{min}$ and subsequently increases with increasing temperature from $G_{min}$ to $G_{cry}$. At $G_{cry}$ and $T_{cry}$ there is a decrease in the rate at which G changes with increasing temperature. The process of forming this class of polymers involves heating an amorphous polymer composition to below the $T_{cry}$ preferably between $T_{soft}$ and $T_{cry}$, and more preferably between $T_{soft}$ and $T_{min}$, and forming the polymer composition. The formed polymer composition is then heated to from $T_{min}$ to $T_{cc}$ for sufficient time to form crystals, i.e. annealed.

In the present invention after the amorphous polymer is formed it can be cooled to ambient condition prior to annealing. This is particularly useful in forming a variety of shapes such as tubes made of amorphous polymer and then annealing them after they have been reshaped for specific applications. The polymer is annealed from $T_{min}$ to $T_{cc}$ and preferably from $T_{cry}$ to $T_{cc}$. The shaping of the amorphous polymer takes place at a low temperature below $T_{cry}$. Yet after the reformed polymer has been crystallized, it cannot be reformed again until the temperature is increased beyond that at which the crystals will start to decimate and the polymer composition will soften.

Included in the polymers which can be formed by the process of the present invention are polyethylene terephthalate, polyamides in which the crystallinity is decreased i.e., a $G_{min}$ and $T_{min}$ is established and copolyamides which are amorphous and fit within the criteria of the modulus of rigidity discussed above.

The present invention is particularly useful in forming amorphous, crystallizable articles having a thickness at some point in the article greater than 0.127 cm (0.050 inches). This is distinguishable from thin films which can be rapidly heated to destroy crystallinity and then shaped. The thicker articles do not require more rapid heat transfer while heated below $T_{ch}$ or $T_{min}$ for shaping while amorphous. A preferred amorphous, crystallizable article is tubing which can be reformed and then annealed.

BRIEF DESCRIPTION OF THE DRAWINGS

FIG. 1 is a general graph of the log of the modulus of rigidity (G) as measured on the Clash-Berg torsion pendulum vs. temperature (T).

FIG. 2 is a graph of the log of the modulus of rigidity (G) vs. temperature (T) for a terpolymer of caprolactam, terephthalic acid, and bis(p-aminocyclohexyl)methane for an amorphous sample and an annealed sample.

FIG. 3 is a graph of the log of the complex tensile modulus (E) as measured on the Vibron apparatus vs. temperature (T) for a variety of polymers including polycarbonate, polybutyleneterephthalate, crystalline polyethyleneterephthalate and amorphous polyethyleneterephthalate.

DESCRIPTION OF THE PREFERRED EMBODIMENTS

The present invention relates to a process to form a class of polymers characterized by specific amorphous and crystalline forms dependent on their thermal histories. Preferably, these are polymers which can be characterized by their stiffness as a function of temperature.

Following is a list of parameters, their definitions, and methods of their measurement which describe the class of polymers useful in the method of the present invention. $T_{cc}$ is the temperature of the first measurement of crystal appearance upon cooling of the polymer from the melt. $T_{ch}$ is a measurement of temperature at which crystallization is no longer occurring upon cooling. $T_{ch}$ is determined by measuring the temperatures at which crystals appear upon heating an amorphous piece of polymer. $T_{cc}$ and $T_{ch}$ can be measured using a Differential Scanning Calorimeter. Between 5 and 10 milligrams of sample is compression molded to form a film which is vacuum dried. To measure $T_{cc}$ the sample is placed in the Differential Scanning Calorimeter and heated to above the polymer melting point, usually at least 280° C., where it is held for two minutes. The sample is then cooled at 10° C. per minute. The sample used to measure $T_{ch}$ is prepared in the same manner as the sample used to measure $T_{cc}$. After the sample film has been prepared, it is heated to above its melt temperature (280° C.) and quenched. This assures an amorphous sample. The sample is then heated at 10° C. per minute. In measuring the $T_{cc}$ and the $T_{ch}$, the sample is indicated to be brought to 280° C. However, the sample can be brought to above the melting point of the polymer of interest. For example, in polyamides and copolyamides the temperature could be 230° C. to 240° C. $T_{cc}$ and $T_{ch}$ are the temperatures at the maxima of the peaks of the curves measured on the Differential Scanning Calorimeter.

For the purposes of the present invention a polymer is considered to be amorphous if there is insufficient crystallization to inhibit forming in a temperature range between $T_g$ and $T_{ch}$. The polymer is plastic in that the polymer is capable of being deformed continuously and permanently in any direction without rupture. The amorphous crystallizable polymer can be made amorphous by quenching to below $T_{ch}$ from the melt. A polymer is considered crystalline if there is sufficient crystal formation to inhibit forming the polymer in the temperature range between $T_g$ and $T_{ch}$, continuously and permanently in any direction without residual stresses remaining in the polymer which would cause the polymer to return to its original shape or cause the polymer to rupture.

The present invention in terms of $T_{cc}$, $T_{ch}$, $T_g$, and $T_m$, the melting point, is a method for forming a crystallizable thermoplastic polymer selected from a group of polymers which has a $T_{cc}$ below its melting point, i.e., begins to crystallize before it melts, and has a $T_{ch}$ above the glass transition temperature, $T_g$. The polymer can be a polymer composition or a polymer as long as the total composition meets the criteria of the $T_g$, $T_{cc}$, $T_{ch}$, $T_m$. An amorphous crystalline polymer is heated to between the $T_g$ and $T_{ch}$. The heated polymer is formed in its amorphous state. The polymer can optionally be cooled or continued to be heated. The polymer is heated to between the $T_{ch}$ and the $T_{cc}$ for a sufficient time to form crystals. Once the polymer composition is crystallized, it will no longer be formable between the $T_g$ and the $T_{ch}$. In order to reform this thermoplastic polymer, it must then be heated to close to or above the $T_m$.

A particular class of the polymer compositions of the present invention is defined in terms of the stiffness of the polymer composition as it varies with temperature. A preferred way to measure the stiffness is by use of G, the modulus of rigidity. The modulus of rigidity is measured according to ASTM Test No. D1043-72, hereby incorporated by reference. In the preferred class of polymers the modulus of rigidity decreases with temperature to a minimum value $G_{min}$ at $T_{min}$. Continued increase of the temperature causes the modulus of rigidity to increase from the minimum up to a $G_{cry}$ at $T_{cry}$. At the $G_{cry}$ there is a decrease in the rate at which the G changes with increasing temperature.

Polymers which can be formed by the method of the present invention have the general performance outlined on FIG. 1. FIG. 1 is a general graph of the log of the modulus of rigidity G in Pascals (Pa) versus the temperature T in degrees Centigrade. On FIG. 1 there are three curves. Curve A indicates the behavior of the polymers of the class useful in the present invention. Curve B indicates the behavior of polymers which are crystalline, and curve C indicates the behavior of polymers which are amorphous. It is noted that in curve C for amorphous polymers, there is a decrease in slope comparable to the decrease in curve A at $G_{soft}$, $T_{soft}$. However, there is no $T_{min}$, $G_{min}$ and the amorphous polymer melts before bottoming out and beginning to increase in slope toward a $G_{cry}$, $T_{cry}$. Crystalline polymers, which behave in the manner of curve B, have a gradually decreasing modulus of stiffness. There is no trough, and the stiffness decreases gradually until the polymer finally melts. Polymers of the class of the present invention start to gradually decrease in stiffness modulus with increasing temperature. Upon reaching a $G_{soft}$ at a $T_{soft}$, the rate of decrease of modulus increases. This is comparable to the behavior of amorphous polymers as described by curve C. However, the polymers useful in the process in the present invention continue to decrease only until they reach a $G_{min}$ at a $T_{min}$. At this point the polymers begin to crystallize, and the modulus of stiffness begins to increase with increasing temperature, thereby forming a trough in the curve. At a point $G_{cry}$ and $T_{cry}$ sufficient crystallization occurs so that the polymer begins to behave in the manner of a crystalline polymer as defined by curve B. The rate of change of G with increasing T slows down.

In the process of the present invention an amorphous, crystallizable polymer is heated to below $T_{cry}$ and has a modulus of stiffness of below $G_{cry}$. The polymer is formable between $T_{soft}$ and $T_{cry}$. This includes the polymer being formed between $T_{soft}$ and $T_{min}$. When forming the polymer above $T_{min}$, between $T_{min}$ and $T_{cry}$, some crystallization occurs. This can be minimized by immediate quenching to below $T_{min}$ so that the polymer is reformable. Upon forming the polymer composition, the polymer can be heated to above $T_{min}$, preferably from $T_{min}$ to $T_{cc}$, for a sufficient time to form crystals so that the polymer behaves in the manner of a crystalline polymer of the type identified by curve B. Alternately, the polymer can be formed in this formable range below $G_{cry}$, $T_{cry}$ and cooled to room temperature. The polymer can then be heated to below $T_{cry}$ and reformed and then subsequently heated to above $T_{min}$, preferably above $T_{cry}$ and below $T_{cc}$, in an annealing step for a sufficient time to form crystals. Once the polymer has been annealed or crystallized, it cannot be reformed unless it is heated to a sufficient temperature to dissipate the stiffening effect of the crystals or melt them. Generally, this temperature is at or close to the melting point of the polymer. Therefore the present invention provides a method for forming a thermoplastic polymer and reforming it at below the melting point of the polymer. This formed or reformed article can then be heated or annealed for a sufficient time to cause crystallization resulting in a stiffness or modulus of the polymer which will not reform at temperatures below $T_{cry}$. It is recognized that crystal formation can occur by heating to below $T_{cry}$, i.e. between $T_{min}$ and $T_{cry}$, for sufficient time so that the $G_{cry}$ is reached.

In the annealing step the polymer is heated between $T_{min}$ and $T_{cc}$ for a sufficient time to form sufficient crystals so that it cannot be reformed at a temperature below $T_{cry}$. The time depends on the temperature. The higher the temperature, the shorter the heating time necessary. FIG. 2 shows the behavior of a terpolymer of caprolactam, terephthalic acid and bis(p-aminocyclohexyl)methane as discussed in Example 1. An amorphous sample begins to crystallize at about 75° C. A sample of this terpolymer anneals, i.e. when it is heated for a sufficient time so that it crystallizes sufficiently, so that the sample can no longer be reformed at a temperature below $T_{cry}$, about 95° C. The time to anneal can vary from about one hour at 75° C. to from about 1 to 10 minutes between 90° C. and 120° C. The heat transfer characteristics of the polymer affect the rate of crystallization. A thicker sample takes a longer time to crystallize.

For the purposes of the present invention as indicated above, the procedure to be followed to identify the class of polymers is that described in ASTM Test No. D1043-72. Analogous methods of measuring stiffness, such as the use of the Vibron Direct Reading Dynamic Viscoelastometer, can be used to identify the polymers useful in the method of the present invention. As indicated in the examples, this alternate method has been used. This method is described in Vibron Direct Reading Dynamic Viscoelastometer Model DDV-II, Instruction Manual 17, October, 1967, published by the Toyo Measuring Instruments Company, Limited, Headquarters in 104, 1-CHOME CHOFUMINEMACHI, OTA-KU, Tokyo, Japan, hereby incorporated by reference.

Polymers useful in the present invention are those which have the behavior shown on curve A of FIG. 1. Such polymers include a variety of copolyamides, as well as polyethylene terephthalate. An example of an amorphous polymer not following curve A, but following curve C, is polycarbonate. An example of a crystalline polymer, not following curve A but following curve B, is polyepsiloncaprolactam. For the purposes of the present invention the term polymer includes the polymer, as well as the polymer and additional additives which can cause the polymer to behave in the manner described by curve A of FIG. 1. For example polyepsiloncaprolactam containing between 0.1 and 10% of a lithium salt, preferably lithium chloride has a behavior which falls along curve A of FIG. 1. Additionally copolyamides, such as the terpolymer of caprolactam, terephthalic acid and bis(p-aminocyclohexyl)methane has been found to be a curve A type polymer and is particularly useful and preferred in the process of the present invention. The most preferred terpolymer contains 90 mol percent of caprolactam, 5 mol percent of terephthalic acid and 5 mol percent of bis(p-aminocyclohexyl)methane. Other polymers following curve A of FIG. 1 and useful in the method of the present invention include copolymers of caprolactam, terephthalic acid and 1,3 or 1,4-cyclohexane bis(methyl amine) with terephthalic acid or isothalic acid. Also useful in the present invention is the terpolymer of caprolactam, hexamethylene diamine and azelaic acid. Another polymer found useful in the present invention is the copolymer of caprolactam and aminododecanoic acid.

Included in the polymers useful in the present invention are those disclosed in U.S. Ser. No. 336,976, filed Jan. 4, 1982 now U.S. Pat. No. 4,398,012, granted Aug. 9, 1983. These polymers are amorphous and generally follow curve A of FIG. 1. However, copolymers which remain amorphous and do not exhibit the trough as shown in FIG. 1 are not useful since these cannot be annealed. An example of such a copolymer is the copolymer of terephthalic acid and an alkyl substituted hexamethylene diamine having the repeating unit

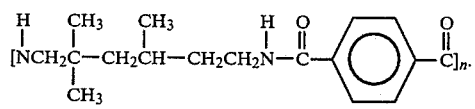

The polymer compositions useful in the present invention are initially amorphous. They do not have sufficient crystallinity to inhibit the formation of the trough in the curve of FIG. 1. That is, the polymers can be heated up to $T_{cry}$ and exhibit a $G_{min}$. Another polymer useful in the present invention is polyethylene terephthalate. Amorphous polyethylene terephthalate behaves in the manner of curve A of FIG. 1.

The polymer composition of the present invention can include polymer blends, and can include various other additives such as stabilizers and inhibitors of oxidative, thermal and ultraviolet light degradation, lubricants, plasticizers, mole-release agents, crosslinking agents, colorants, including dyes and pigments, impact modifiers and additives such as fibers and particulate fillers and reinforcing agents which are not deleterious to physical properties or promote premature crystallization.

The process of the present invention is useful for forming thick articles, as well as thin articles made from amorphous crystallizable polymers. For example articles thicker than 0.127 cm (0.050 inches) thick which could not immediately be heated and cooled due to heat transfer limitations could be formed by the process of the present invention. Articles particularly preferred include tubing and sheets both having thicknesses of from 0.127 cm (0.050 inches) to 1.27 cm (0.500 inches) preferably 0.127 cm (0.050 inches) to 0.635 cm (0.250 inches) and more preferably 0.127 cm (0.050 inches) to 0.318 cm (0.125 inches). Tubing diameter with the indicated thicknesses as wall thicknesses is limited only by production (i.e. extrusion) equipment limitations. The articles are first formed into an initial shape, i.e. a tube or sheet. The article can be reformed according to the process of the present invention, and annealed.

Several examples are set forth below to illustrate the nature of the invention and the manner of carrying it out. However, the invention should not be considered as being limited to the details thereof. All parts are percents by weight unless otherwise indicated.

EXAMPLES 1–4

In Examples 1–4 polymer compositions were made based on a copolyamide containing 90 mol percent caprolactam, 5 mol percent terephthalic acid, and 5 mol percent of bis(p-aminocyclohexyl)methane. In Example 1 this polymer alone was tested according to ASTM D1043-72 using a Clash-Berg torsion pendulum. The results are shown on FIG. 2 as a graph of the log of the modulus of rigidity G (Pa) vs. temperature T (°C.). The torsion pendulum test was conducted while raising the temperature 1° C. per minute. The initial copolyamide was amorphous. The polymer was soft and moldable between 60° C. and about 90° C., more preferably from 60°–80° C.

The polymer was compression molded into discs 0.3175 cm (⅛ inch) thick and 5.08 cm (2 inches) in diameter in a hydraulic press set at 260° C. The discs were quenched in cold tap water at about 10° C. Tensile bars and flex bars were injection molded at a polymer temperature of 230° C. and a mold temperature of 32.° C. The tensile bars were (ASTM Type 1 dog bones) 0.3175 cm (⅛ inch) thick, 1.27 cm (½ inch) wide at the neck and 2.54 cm (1 inch) wide at the widest portion and 19.3 cm (7.6 inches) long. The flex bars were 0.3175 cm (⅛ inch) thick by 1.27 cm (½ inch) wide and 12.7 cm (5 inches long), and 0.635 cm (¼ inch) thick by 1.27 cm (½ inch) wide and 12.7 cm (5 inches) long. Tubing having an outside diameter of 2.54 cm (1 inch) and an inside diameter of 1.9 cm (¾ inch) was extruded at 230° C. using a 5.08 cm (2 inch) NRM single screw extruder. Each of these articles was quenched in cold tap water at about 10° C. They were then put under hot tap water at about 70° C. and became soft and pliable. They could be formed by hand. The molded articles were annealed at 105° C. for 40 minutes. The annealed samples were tested according to ASTM D1043-72 in the same manner as the amorphous sample. The result is shown as the "Annealed" curve on FIG. 2.

The deformation of a sample under a load can be measured as the DTUL, the distortion temperature under load according to ASTM Test No. D648. Under this procedure a 0.635 cm (¼ inch) by 1.27 cm (½ inch) by 12.7 cm (5 inch) bar is subjected to a load of 455 kPa (66 psi) or 1820 kPa (264 psi) applied to the center and the temperature is raised at 2° C./minute. The temperature at a specified deformation is measured. The DTUL at 455 kPa (66 psi) for the amorphous material increased from 69° C. to about 113° C. after 4 minutes, and then gradually increased to about 115° C. after being annealed for 15 minutes.

Other physical properties measured included tensile strength in Pa (psi), as measured according to ASTM Test No. D638, flexural strength and modulus in Pa (psi) as measured according to ASTM Test No. D790, unnotched and notched Izod impact results, Nm/m (foot pounds/inch) measured according to ASTM Test No. D256. The $T_{cc}$ and $T_{ch}$ were measured according to the procedure discussed above. The Drop Weight Impact was measured using the procedure of ASTM D2444 with Gardner impact apparatus for measurement. The results are summarized in Table I below.

EXAMPLE 2

Example 1 was reproduced except that the copolymer composition contained 7 percent by weight of ethylene acrylic acid and 7 percent by weight of ethylene ethylacrylate. Here again, the composition containing the amorphous copolyamide was found to behave in the manner of curve A of FIG. 1. This composition was then annealed at 120° C. for 15 minutes in order to crystallize it. The results are summarized in Table I.

TABLE I

|  | Ex. 1 | | Ex. 2 | |
| --- | --- | --- | --- | --- |
|  | As Molded | Annealed | As Molded | Annealed |
| Copolyamide (%) | 100 | 100 | 86 | 86 |
| EAA (%) |  |  | 7 | 7 |
| EEA (%) |  |  | 7 | 7 |
| Tensile Str., MPa (psi) | 81.4 (11800) | 81.4 (11800) | 59.3 (8600) | 66.9 (9700) |
| Flex Str., MPa (psi) | 103.4 (15000) | 119.3 (17300) | 70.3 (10200) | 81.4 (11800) |
| Flex Mod., MPa (psi) | 248.2 ($3.6 \times 10^5$) | 248.2 ($3.6 \times 10^5$) | 186.2 ($2.7 \times 10^5$) | 193.05 ($2.8 \times 10^5$) |
| Drop Wt, J. (ft. lbs.) | 9.5 (7) | 241 (177) |  |  |
| No Notch Izod, Nm/m (ft. lbs./in.) | 32.02 (60) | 26.69 (50) |  |  |
| Notch Izod, Nm/m (ft. lbs./in.) | 58.7 (1.1) | 53.4 (1.0) |  |  |
| DTUL, 455 kPa (66 psi) (°C.) | 55 | 115 |  |  |
| DTUL, 1820 kPa (264 psi) (°C.) | 56 |  |  |  |
| Appearance | Clear | Trans- | White | White |

TABLE I-continued

|  | Ex. 1 | | Ex. 2 | |
| --- | --- | --- | --- | --- |
|  | As Molded | Annealed | As Molded | Annealed |
|  | amorp. | lucent cryst. | amorp. | cryst. |
| $T_{ch}$ (°C.) | 110 |  |  |  |
| $T_{cc}$ (°C.) | 135 |  |  |  |
| $T_g$ (°C.) | 68 |  |  |  |

EXAMPLES 3 AND 4

In Examples 3 and 4, 15 percent and 30 percent by weight of short fiberglass filler was added to the amorphous copolymer used in Example 1. The polymer composition containing the glass filler behaved in a manner similar to the amorphous curve shown on FIG. 2. This material could be molded and remolded before annealing. After annealing, the composition behaved in a similar manner as the composition which followed the annealed curve of FIG. 2. The physical properties measured for the compositions in Examples 3-4 are summarized on Table II below.

TABLE II

|  | Ex. 3 As Molded | Ex. 4 As Molded |
| --- | --- | --- |
| Copolyamide (%) | 70 | 85 |
| Glass (%) | 30 | 15 |
| Tensile Str., psi | 131.0 (19000) | 95.8 (13900) |
| Flex Str., psi | 188.2 (27300) | 141.3 (20500) |
| Flex Mod. psi | 668.8 ($9.7 \times 10^5$) | 399.9 ($5.8 \times 10^5$) |
| No notch Izod ft. lbs./in. | 976.8 (18.3) | 555 (10.4) |
| DTUL, 455 KPa (66 psi) (°C.) | 61 | 60 |
| DTUL, 1820 KPa (264 psi) (°C.) | 58 | 60 |

The amorphous crystallizable polymer compositions of Examples 1-4 could all be formed upon heating the polymer to between 60° and 70° C., and all had the characteristics of the amorphous curve of FIG. 2. The polymers were then cooled. The cooled polymers could be reheated to the temperatures of 60°-80° C. and reformed. The polymers were then heated to above about 100°-105° C. for sufficient time to be annealed, and as indicated in Example 1, the annealing took place for 40 minutes at 105° and in Example 2 the annealing took place for 15 minutes at 120° C. Once the part was annealed, it could not be reformed at 60°-80° C., but the polymer had to be heated to almost the melt temperature before it could be reshaped.

EXAMPLE 5

An amorphous polyethylene terephthalate sample was heated according to the referenced Vibron procedure to measure the complex tensile modulus, E (Pa). This modulus measures stiffness in a similar manner as G, the modulus of rigidity measured by the Clash-Berg torsion pendulum. The results are shown on FIG. 3 as a plot of log of the complex tensile modulus E versus the temperature T in °C. The amorphous polyethylene terephthalate had the characteristic curve of polymers useful in the process of the present invention as indicated on curve A on FIG. 1. The polymer was annealed for 3-4 minutes at 180° C. The annealed or crystalline polyethylene terephthalate was retested using the Vibron method. The result is shown as the PET, crystalline curve on FIG. 3. By way of comparison, the Vibron method was used to test crystalline polybutylene terephthalate, as well as amorphous polycarbonate. The results are also shown on FIG. 3. Polybutylene terephthalate and polycarbonate could not be used in the process of the present invention, while amorphous polyethylene terephthalate has the characteristic curve required.

While exemplary embodiments of the invention have been described, the true scope of the invention is to be determined from the following claims:

What is claimed is:

1. An article of manufacture made of a crystallizable amorphous thermoplastic polymer composition having a modulus of rigidity G which decreases with increasing temperature to a $G_{min}$ at $T_{min}$ and subsequently increases with increasing temperature from $G_{min}$ to $G_{cry}$ at $T_{cry}$ at which point there is a decrease in the rate at which G changes with increasing temperature, the polymer crystallizing below $T_{cc}$ upon cooling from a temperature above $T_{cc}$, the article having a thickness of from 0.127 cm (0.050 inches) to 1.27 cm (0.500 inches).

2. The article as recited in claim 1 in the form of a sheet.

3. The article as recited in claim 1 in the form of a tube.

4. The article as recited in claim 1 wherein the thickness is from 0.127 cm (0.050 inches) to 0.635 cm (0.025 inches).

5. The article as recited in claim 1 wherein the polymer composition is polyepsiloncaprolactam and lithium salt.

6. The article as recited in claim 1 wherein the polymer composition comprises polyepsiloncaprolactam and 0.2 to 2.0 percent by weight based on the polycaprolactam of lithium chloride.

7. The article as recited in claim 1 wherein the polymer composition is a polyamide terpolymer.

8. The article as recited in claim 6 wherein the polyamide terpolymer is selected from the class of: epsiloncaprolactam, terephthalic acid and bis(p-aminocyclohexyl)methane; epsiloncaprolactam, bis-amino methyl cyclohexane and terephthalic acid; epsiloncaprolactam, bis-amino methyl cyclohexane and isophthalic acid; hexamethylene, diamine, azelaic acid and epsiloncaprolactam; and epsiloncaprolactam and amino undecanoic acid.

9. The article as recited in claim 8 wherein the polymer composition comprises polyethylene terephthalate.

* * * * *

REEXAMINATION CERTIFICATE (1384th)

United States Patent [19]

Vanderkooi, Jr. et al.

[11] B1 4,508,769

[45] Certificate Issued  Nov. 13, 1990

[54] PROCESS TO FORM AMORPHOUS CRYSTALLIZATION THERMOSPLASTIC POLYMERS

[75] Inventors: Nicholas Vanderkooi, Jr., Pomton Plains; Philip E. Stevenson, South Orange; Robert J. Welgos, Wharton, all of N.J.

[73] Assignee: Allied Corporation

Reexamination Request:
No. 90/001,906, Dec. 11, 1989

Reexamination Certificate for:
Patent No.: 4,508,769
Issued: Apr. 2, 1985
Appl. No.: 580,396
Filed: Feb. 18, 1984

Related U.S. Application Data

[62] Division of Ser. No. 395,432, Jul. 6, 1982, Pat. No. 4,455,417.

[51] Int. Cl.$^5$ .............................................. F16L 11/00
[52] U.S. Cl. .................................... 428/36; 428/220; 528/323; 528/324
[58] Field of Search ............ 528/272, 289, 292, 308.1, 528/308.5, 310, 324, 325, 310, 502, 503, 480; 525/437, 419; 428/337, 36, 220; 264/239

[56] References Cited

U.S. PATENT DOCUMENTS

| | | | |
|---|---|---|---|
| T876,001 | 7/1970 | Bell et al. | 528/305 |
| T915,001 | 10/1973 | Berkehile et al. | 264/89 |
| T921,008 | 1/1973 | Thamm | 264/85 |
| T941,018 | 12/1975 | Clarke | 156/69 |
| 2,336,384 | 12/1943 | Baker et al. | 428/408 |
| 2,372,630 | 3/1945 | Smith | 264/235 |
| 2,997,743 | 8/1961 | Isaksen | 264/291 |
| 3,009,206 | 11/1961 | Salyer et al. | 264/235 |
| 3,150,435 | 9/1964 | McColm | 432/8 |
| 3,200,182 | 8/1965 | Hechelhammer et al. | 264/235 |
| 3,257,489 | 6/1966 | Heffelinger | 264/289 |
| 3,293,341 | 12/1966 | Boeke | 264/94 |
| 3,303,159 | 2/1967 | Saunders | 524/486 |
| 3,322,731 | 3/1967 | Cook et al. | 528/324 |
| 3,405,198 | 10/1968 | Rein et al. | 264/328.1 |
| 3,414,647 | 12/1968 | Saunders et al. | 264/235 |
| 3,429,854 | 2/1969 | Siggel et al. | 264/547 |
| 3,463,773 | 8/1969 | Williams et al. | 220/321 |
| 3,493,648 | 2/1970 | Griffith | 264/331 |
| 3,502,766 | 3/1970 | Tsuruta et al. | 264/289 |
| 3,504,077 | 3/1970 | Sloan | 264/210 |
| 3,504,080 | 3/1970 | Siggel et al. | 264/325 |
| 3,513,110 | 5/1970 | Noether | 521/182 |
| 3,541,200 | 11/1970 | Niegisch | 264/343 |
| 3,544,673 | 12/1970 | Inskeep et al. | 264/253 |
| 3,546,331 | 12/1970 | Niegisch | 264/343 |
| 3,546,332 | 12/1970 | Merriam et al. | 264/343 |
| 3,554,991 | 1/1971 | Griffith | 426/341 |
| 3,560,605 | 2/1971 | Siggel et al. | 264/328 |
| 3,562,199 | 2/1971 | Hill et al. | 423/307 |
| 3,562,200 | 2/1971 | Jones et al. | 524/444 |
| 3,577,502 | 5/1971 | Selman et al. | 264/235 |
| 3,577,507 | 5/1971 | Corbett | 264/321 |
| 3,578,730 | 5/1971 | Herwig et al. | 525/173 |
| 3,595,836 | 7/1971 | Korneli et al. | 528/308.2 |
| 3,673,139 | 6/1972 | Krach | 528/170 |
| 3,706,699 | 12/1972 | Conix et al. | 524/430 |
| 3,767,753 | 10/1973 | Suzuki | 264/138 |
| 3,960,807 | 6/1976 | McTaggart | 428/36.92 |
| 3,980,748 | 9/1976 | Okuyama et al. | 264/289 |
| 4,000,229 | 12/1976 | Wainer | 264/24 |
| 4,003,368 | 1/1977 | Maxel | 126/390 |
| 4,022,756 | 5/1977 | Chapman et al. | 528/239 |
| 4,025,594 | 5/1977 | Agrawal | 264/97 |
| 4,107,251 | 8/1978 | Bollen et al. | 264/171 |
| 4,110,395 | 8/1978 | Akutin et al. | 264/216 R |
| 4,150,079 | 4/1979 | Chang | 264/523 |
| 4,225,549 | 9/1980 | Allan | 264/234 |
| 4,234,536 | 11/1980 | Thiel et al. | 264/520 |
| 4,247,514 | 1/1981 | Luise | 264/345 |
| 4,260,567 | 4/1981 | Poppe et al. | 264/25 |
| 4,264,558 | 4/1981 | Jacobsen | 264/523 |
| 4,309,528 | 1/1982 | Keske et al. | 528/188 |
| 4,358,561 | 11/1982 | Keske et al. | 524/600 |
| 4,375,442 | 3/1983 | Ota et al. | 264/25 |
| 4,378,326 | 3/1983 | Garlington et al. | 264/216 |
| 4,379,099 | 4/1983 | Ota et al. | 264/25 |
| 4,476,084 | 10/1984 | Takada | 264/342 |
| 4,482,518 | 11/1984 | Brady | 264/535 |
| 4,522,670 | 6/1985 | Caines | 156/220 |
| 4,564,495 | 1/1986 | Nilsson et al. | 264/291 |
| 4,572,811 | 2/1986 | Ota et al. | 264/25 |
| 4,589,559 | 5/1986 | Hayashi et al. | 215/1 C |
| 4,590,021 | 5/1920 | Ota et al. | 264/25 |
| 4,597,932 | 7/1986 | Kurihara et al. | 264/145 |
| 4,670,203 | 6/1987 | Chang | 264/40.6 |

*Primary Examiner*—John III Kight

[57] ABSTRACT

A method for forming an amorphous crystallizable thermoplastic polymer composition. The polymer composition has a modulus of rigidity which decreases to a minimum value with increasing temperature and then begins to increase. The process includes heating polymer to below a temperature at which crystal formation occurs and form the polymer. The polymer composition is then heated to a temperature at which crystal formation can occur and be annealed. This process is useful to make articles having a thickness of from 0.127 cm (0.050 inches) to 1.27 cm (0.50 inches) such as sheets and tubes of the amorphous polymer and then reforming and annealing them.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is cancelled.

Claims 1, 7 and 8 are determined to be patentable as amended.

Claims 2–6, dependent on an amended claim are determined to be patentable.

New claims 10 and 11 are added and determined to be patentable.

1. An article of manufacture made of a crystallizable amorphous thermoplastic *polyamide* polymer composition having a modulus of rigidity G which decreases with increasing temperature to a $G_{min}$ at $T_{min}$ and subsequently increases with increasing temperature from $G_{min}$ to $G_{cry}$ at $T_{cry}$ at which point there is a decrease in the rate at which G changes with increasing temperature, the polymer crystallizing below $T_{cc}$ upon cooling from a temperature above $T_{cc}$, the article having a thickness of from 0.127 cm (0.050 inches) to 1.27 cm (0.500 inches).

7. The article as recited in claim 1 wherein the polymer composition is a polyamide *copolymer or* terpolymer.

8. The article as recited in claim [6] *7* wherein the polyamide *copolymer or* terpolymer is selected from the class of: epsiloncaprolactam, terephthalic acid and bis(p-aminocyclohexyl)methane; epsiloncaprolactam, bis-amino methyl cyclohexane and terephathalic acid; epsiloncaprolactam, bis-amino methyl cyclohexane and isophthalic acid; hexamethylene[,] diamine, azelaic acid and epsiloncaprolactam; and epsiloncaprolactam and amino undecanoic acid.

*10. The article as recited in claim 1 wherein said crystallizable amorphous thermoplastic polyamide polymer is a polyamide terpolymer of epsilon-caprolactam, terephthalic acid and bis (p-aminocyclohexyl)methane.*

*11. The article as recited in claim 10 wherein said polyamide terpolymer comprises 90 mol percent of epsiloncaprolactam, 5 mol percent of terephthalic acid and 5 mol percent of bis(p-aminocyclohexyl)methane.*

* * * * *